Dec. 16, 1952  L. J. CAREY  2,621,634
FLUID OPERATED WINDSHIELD WIPER MOTOR
Filed Jan. 8, 1948  2 SHEETS—SHEET 1

INVENTOR.
LEROY J. CAREY
BY George M Soule
ATTORNEY

Dec. 16, 1952  L. J. CAREY  2,621,634
FLUID OPERATED WINDSHIELD WIPER MOTOR

Filed Jan. 8, 1948  2 SHEETS—SHEET 2

INVENTOR.
LEROY J. CAREY

BY George M. Soule
ATTORNEY

Patented Dec. 16, 1952

2,621,634

UNITED STATES PATENT OFFICE 2,621,634

FLUID OPERATED WINDSHIELD WIPER MOTOR

Leroy J. Carey, Cleveland, Ohio, assignor to The Marquette Metal Products Company, Cleveland, Ohio, a corporation of Ohio Application January 8, 1948, Serial No. 1,213

3 Claims. (Cl. 121—164)

An object is to provide a fluid actuated parking valve device for a windshield wiper motor or the like, said device operating automatically consequent upon shutting off of supply fluid to the motor to hold the piston at one end of its cylinder.

Other objects and features of the invention will become apparent from the following description of the preferred form.

Figure 1:
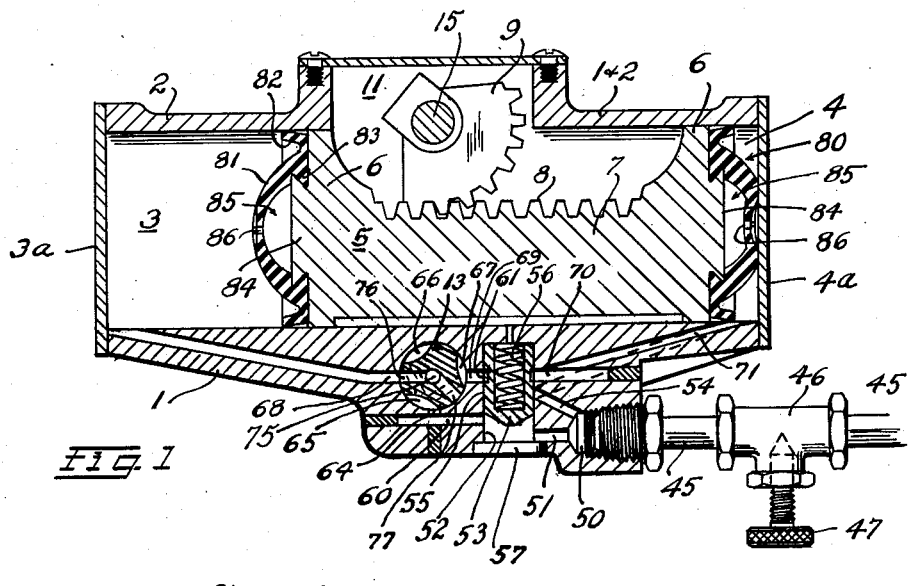
Figure 2:
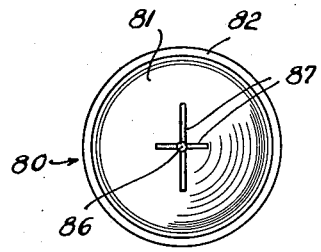
Figure 4:
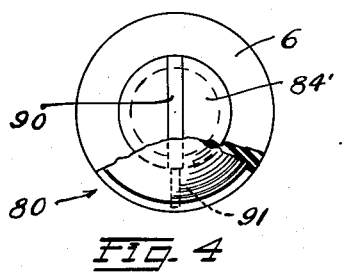
Figure 3:
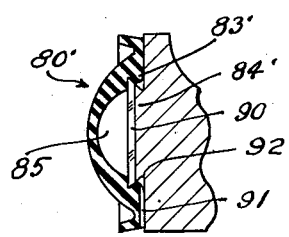
Figure 5:
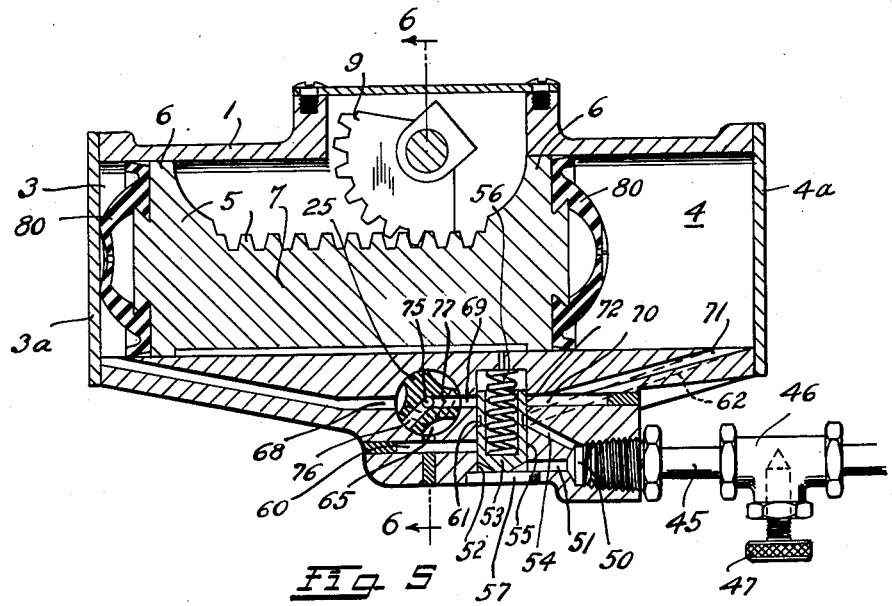
Figure 6:
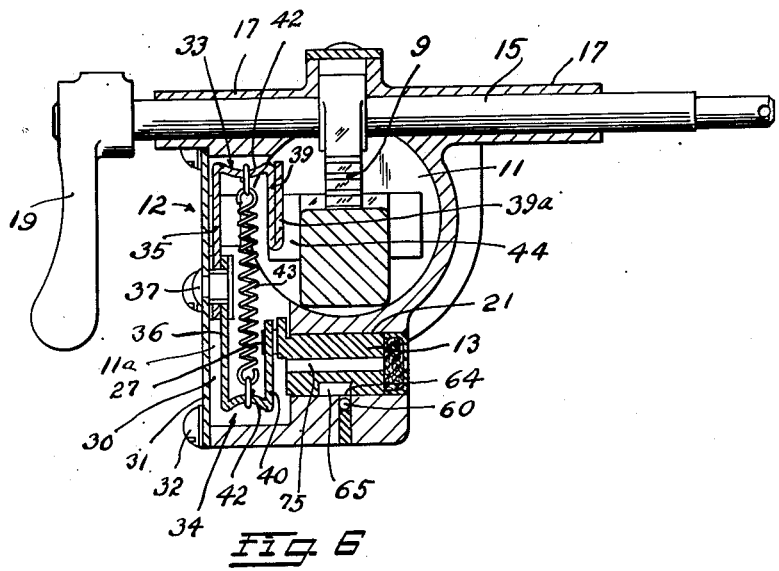

In the drawings, Fig. 1 is a longitudinal central sectional assembly view of the motor and parking valve mechanism, the latter being in its inactive or non-parking-effecting position. Fig. 2 is an outer end view of one of the piston sealing dashpot devices. Fig. 3 is a sectional central detail view showing a modified construction of cushioning dashpot and seal for the piston. Fig. 4 is an end view partly in section showing the construction according to Fig. 3. Fig. 5 is a view similar to Fig. 1 showing the parking valve in operating position and the power piston in parked position. Fig. 6 is a transverse sectional assembly view of the motor taken substantially along the line 6—6 on Fig. 5.

A main metal housing 1 of the motor has substantially identical opposed, aligned cylinder portions 2 forming pressure chambers 3 and 4 in cooperation with a power piston 5 and removable cylinder head closure plates or discs 3a and 4a. The power piston has cylindrical disc-like heads 6 rigidly connected by a stem or rod portion 7 having rack teeth 8 formed thereon. The rack teeth are in constant mesh with a gear sector 9 disposed within a central enlarged chamber-forming portion 11 of the housing defining a working space for the piston rod and gear sector in open communication with a lateral enlargement 11a, Fig. 6, of said space containing a snap action toggle mechanism generally designated 12 for an automatic fluid reversing valve of the motor. The reversing valve comprises principally a rotary (oscillating) valve plug 13 and associated ports and passages to be described later.

The gear sector 9, Fig. 6, is supported by a power takeoff shaft 15 suitably connected therewith. The opposite ends of the shaft 15 extend through respective bearing formations 17 of the housing 1, one end of the shaft being adapted to carry a windshield wiper drive arm (not shown). The other end may have an emergency operating arm 19 fixed thereto in the event of fluid supply pressure failure. The shaft 15 usually extends through the windshield framework or an adjacent vehicle body wall, and mounting connections (not shown) are secured to the housing 1 in any appropriate manner.

The automatic reversing valve plug 13 (Figs. 1, 5 and 6) is disposed in a suitable horizontal cross bore 21 of the housing as best shown in Fig. 6. The plug 13 comprises a generally cylindrical body having circumferentially spaced abutments 27 (one shown) projecting from one end in parallel relationship to each other for alternating operating contact with the toggle mechanism 12.

The snap action toggle mechanism 12 (Fig. 6 for operating the valve plug 13) is disposed in the chamber 11a defined in part by a surrounding housing wall 30, complemented by a readily removable cover plate 31 which is the sole support for the toggle mechanism and may be secured to the wall 30 as by screws 32. The toggle mechanism comprises a motor-actuated toggle arm 33 and a valve actuating toggle arm 34, both adapted to be made as sheet metal U-shaped parts. Two overlapped toggle arm portions 35 and 36 are pivotally secured together and to the cover plate 31 as by a non-binding rivet 37 passing through said arm portions and the cover plate. The remaining arm portions 39 and 40 are wholly free from each other. End indented or crotch portions 42 of the toggle arms support respective eye formations of a coiled tension spring 43.

To operate the toggle mechanism, the piston stem or rod portion 7 has integrally formed thereon axially spaced abutment shoulders 44 (one shown) positioned for engagement with opposite edges of the toggle arm 33 during movement of the piston in respectively opposite directions. The strip stock forming the toggle arm portion 39 for abutment with the shoulders 44 is doubled back on itself at 39a to widen the effective abutment edges of the arm.

The toggle mechanism operates substantially as explained in C. R. Sacchini Patent 2,450,564, October 5, 1948, owned by the assignee hereof. When the toggle arms, by operation of the piston 5, are brought into dead center alignment, the arm 33 usually snaps into engagement with one of two spaced stops (not shown) formed on the walls 30 and the contracting spring 43 then jerks the valve plug to reversed position.

Fluid is supplied to the motor through a suitable pipe or conduit 45 which incorporates a main shut-off or control device 46 of the needle valve type enabling precision motor speed adjustment and relatively slow fluid-cutoff. The needle valve plug has an operating handle or knob 47. The control device may be positioned at any distance from the motor or may be built into the motor body if desired. A section of the supply pipe leads through a suitable threaded fitting into a fluid receiving cavity 50 at the base of the motor, said cavity having a duct 51 aligned with the supply pipe and intersecting a vertical bore 52 which forms the operating chamber for the parking valve plug or plunger 53. Additionally, the chamber 50 has an obliquely extending duct 54 intersecting the bore 52 and shown in Fig. 1 as closed by a lower land surface portion 55 of the plunger 53. The bottom end of the plunger is tapered so that it cannot close the passage 51.

The plunger 53 is socketed at its top end and contains a compression spring 56 which in the parking position of the plunger, Fig. 5, holds the same with its lower tapered end against a stop closure plate 57 for the bore 52. In that position the land 55 of the plunger closes a main horizontal supply extension passage 60 offset upwardly out of alignment with the supply passage 51. Also in the parking position of the plunger an annular neck 61 thereof registers with the upper end of the oblique supply branch 54 and communicates that passage with an oblique parking fluid conducting passage 62 shown only in dotted lines and which leads to the chamber 4 at the right end of the piston. Thus primarily the parking function of the plunger 53 is to admit pressure fluid from the supply line to one end only of the piston and cause the piston to be moved to the opposite end of the cylinder as in Fig. 5; said plug meanwhile blocking flow of fluid to the opposite end chamber 3 as will be explained later.

The short horizontal supply passage 60 (left of parking plunger) which is communicated with the main passage 51 in the raised position of the parking valve plunger as illustrated in Fig. 1 leads through a short communicating port 64 to a manifold cavity 65, Figs. 1, 5 and 6, formed in the fluid reversing valve plug 13. Communication is established between the duct 64 and cavity 65 in all positions of the reversing valve. Beyond the cavity 65 toward one end of the reversing valve plug, said cavity communicates through oblique passages formed in the plug and as shown in dotted lines with a pair of cavities 66 and 67 which communicate at different times with respective oppositely disposed ports 68 and 69 leading respectively to the piston cylinder chambers 3 and 4. The communicating passage for port 68 leads directly to the chamber 3 but fluid supplied to the motor chamber 4 through the port 69 has to pass through the parking valve bore 53. Said bore, diametrically opposite the port 69, has a port 70 leading to an oblique passage 71 communicating with the cylinder chamber 4. The parking-valve-controlled ports 69 and 70 are communicated with each other only when the parking valve is in its raised or nonparking position shown by Fig. 1. In the lowered or parking position (Fig. 5) an upper land 72 of the plunger cuts off both ports 69 and 70.

The motor chambers 3 and 4 exhaust through an axial bore 75 of the reversing valve plug 13. When the plug is in the position shown by Fig. 1 the port 68 (for chamber 3) is aligned with the exhaust bore 75 through a radial passage 76 in the plug; and, when the plug has been moved to its other position, then the port 69 is aligned with the radial passage 77 for normally exhausting the chamber 4. The valve 13 is moved by the toggle mechanism to the Fig. 1 position at about the end of the piston stroke to the right, and is reversed to the Fig. 5 position at the end of the leftward stroke.

In operation, when the control valve 47 is opened a certain amount, as in Fig. 1, fluid pressure acting on the lower end of the parking valve plunger 53 raises the plunger against the bias of its spring to the position shown in Fig. 1 so that operating fluid flows to the reversing valve at the port 64 and the reversing valve is oscillated to and from the positions illustrated by Figs. 1 and 5 respectively and repeatedly so long as substantial operating pressure is maintained. Now if the valve 47 is partly closed so that the pressure in the bottom of the plunger bore 53 is insufficient to overcome the spring 56 and hold the plunger in raised position, the plunger will be forced down by the spring into the Fig. 5 position. Thereupon as will be seen from Fig. 5 no more fluid can be admitted to the left hand cylinder chamber 3 because the port 60 will be closed. Meanwhile until the piston is brought to its parked position the exhaust line from cylinder space 3 remains open through the reversing valve radial passage 76. The restricted supply of operating fluid now flows through the oblique branch passage 54 to the chamber provided by the neck 61 of the parking valve plunger and thence to the alternate supply passage 62 for the chamber 4 thereby causing the piston to become parked in the position illustrated in Fig. 5. As the piston moves to parked position the valve 13 reverses, cutting off the exhaust for chamber 3 and reconditioning the motor for normal operation, i. e. for initial rightward stroke of the power piston, consequent upon admission of sufficient pressure to cause the parking valve plunger to be raised.

When a motor such as shown is operated by elastic fluid such as compressed air, it tends to be noisy particularly when high operating fluid pressure is used and the load becomes light. A feature of the invention is provision of piston seals which act as cushioning bumpers to reduce such noise as mentioned and serve as dashpots. The cushioning and seal devices are indicated generally at 80 and each as shown at the left in Fig. 1 (cf. Fig. 2) comprises a molded disc of synthetic rubber having a central dome-shaped hollow body portion 81, a free annular sealing flange 82 for contact with the cylinder wall and an inwardly extending annular, elastically expandable attaching flange 83. The attaching flange 83 provides an indention on the inner side of the device 80 complementary to an associated button-like projection 84 of the piston head over which the flange 83 can be easily expanded by pressure on the device axially of the piston. The two cushion seal devices are identical in each installation, the device 80 shown at the right in Fig. 1 is being centrally depressed by contact with the planar face of the cylinder head plate 4a. When the device 80 bumps against the cylinder head, fluid generally enclosed by the space 85 between the wall 81 and button 84 is squeezed out as through a central small orifice 86 in the thinner part of the wall, thus causing the device 80 to act as a cushioning dashpot in arresting the piston. To prevent a vacuum cup effect at the centrally depressed portion of the wall 81 (right Fig. 1) suitable vacuum breaker recesses may be formed as grooves such as shown at 87 in communication with the exposed end of the orifice 86 and extending laterally therefrom a sufficient distance so that the extremities of the grooves cannot be sealed by contact with the cylinder head.

The alternate construction of the cushion dashpot seals shown by Figs. 3 and 4 provides the dashpot orifice corresponding to 86 in the form of a cross slot 90 in the flange or button device 84' which is in effect continued by one or more slots as at 91 in the back face of the cushion seal 80' and leading to its boundary so that fluid trapped in the chamber 85 can leave restrictedly by way of said slots 90 and 91 to the associated piston/cylinder chambers 3 or 4. To insure communication between the slots 90 and 91, and provide the desired restriction to fluid flow, the annular flange 83' on the cushion device stops short of filling the annular undercut 92 defining the root portion of the flange 84'.

I claim:

1. In a reciprocating fluid motor having a pair of pressure chambers, a fluid supply duct, an automatic reversing valve in said duct, motor operating duct branches leading therefrom to the chambers and rendered alternately active by the reversing valve to supply and exhaust fluid in respect thereto, a parking valve bore intersecting the supply duct, a spring biased valve plunger in the bore movable therein by duct pressure at normal motor-operating value to a position opening the duct for automatic operation of the motor and, at a lower value, being biased to a second position closing a portion of the duct leading to the reversing valve, and a branch supply duct controlled by the valve plunger in the second position to admit pressure fluid to one of the chambers in by-passing relation to the reversing valve for parking.

2. In a fluid pressure operated reciprocating motor having an automatic fluid reversing valve, means forming a fluid inlet chamber having two outlet branches, a valve bore intersected by both branches, a spring biased parking valve plunger slidable in the bore to two positions, one of the branches communicating with the bore adjacent a piston end portion of the plunger for enabling the plunger to be forced by inlet fluid pressure to a non-parking position against its biasing means, valve means rendered operative by the plunger in said non-parking position for diverting operating fluid to the reversing valve through said bore, a parking fluid passage leading to an operating pressure space of the motor and having an inlet end interesecting said bore, valve cavity means on the plunger cooperating with said inlet end and the other said branch for communicating the two when the plunger is moved by its biasing spring to its parking position, said valve means at such time being rendered operative by the plunger to block passage of fluid to reversing valve.

3. A snap action toggle mechanism for a reciprocating fluid operated motor having a piston and opposed pressure chambers cooperating therewith and a reversing valve movable to two positions for alternately controlling fluid supply and exhaust to and from the chambers; said snap action toggle mechanism comprising two coaxially pivoted U-shaped arms each substantially of one piece, the arms having adjacent relatively long legs to form the pivot connection and each having a short leg extending parallel to the longer legs but unconnected with each other, a tension spring supported at its end by respective generally parallel portions of the U-shaped arms connecting the long and short legs, the short legs thus lying beyond the plane of movement of the spring in a direction away from the pivot connection, one short leg being arranged for operating contact with the piston and the other with the valve.

LEROY J. CAREY.

REFERENCES CITED

The following references are of record in the file of this patent:

UNITED STATES PATENTS

| Number | Name | Date |
|---|---|---|
| 1,458,922 | Rivera | June 12, 1923 |
| 1,715,406 | Christenson | June 4, 1929 |
| 2,009,958 | Hance | July 30, 1935 |
| 2,169,451 | Parker | Aug. 15, 1939 |
| 2,345,433 | Simpson | Mar. 28, 1944 |
| 2,404,315 | Rotter et al. | July 16, 1946 |
| 2,421,318 | De Lancey | May 27, 1947 |
| 2,450,564 | Sacchini | Oct. 5, 1948 |
| 2,451,449 | Sacchini | Oct. 12, 1948 |